US010906414B2

(12) United States Patent
Fong et al.

(10) Patent No.: US 10,906,414 B2
(45) Date of Patent: Feb. 2, 2021

(54) SYSTEMS AND METHODS FOR RESTARTING ELECTRIFIED VEHICLE CHARGING WITHOUT UNPLUGGING

(71) Applicant: FORD GLOBAL TECHNOLOGIES, LLC, Dearborn, MI (US)

(72) Inventors: Wai Hwa Fong, Canton, MI (US); Jeffery R. Grimes, Canton, MI (US); Navid Rahbari Asr, Inkster, MI (US); Charles Everett Badger, II, Westland, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 112 days.

(21) Appl. No.: 16/218,635

(22) Filed: Dec. 13, 2018

(65) Prior Publication Data

US 2020/0189407 A1 Jun. 18, 2020

(51) Int. Cl.
*B60L 53/16* (2019.01)
*B60L 3/00* (2019.01)
(52) U.S. Cl.
CPC ............. *B60L 53/16* (2019.02); *B60L 3/0046* (2013.01); *B60L 2250/00* (2013.01)
(58) Field of Classification Search
CPC .... B60L 53/16; B60L 3/0046; B60L 2250/00; B60L 3/00
See application file for complete search history.

(56) References Cited

U.S. PATENT DOCUMENTS

| 9,457,791 | B2 | 10/2016 | Vitale et al. | |
|---|---|---|---|---|
| 2012/0221473 | A1 | 8/2012 | Redmann et al. | |
| 2013/0066499 | A1* | 3/2013 | Niste | B60L 58/12 701/22 |
| 2013/0346010 | A1 | 12/2013 | Schulz | |
| 2014/0159660 | A1 | 6/2014 | Klose et al. | |
| 2014/0216693 | A1* | 8/2014 | Pekarsky | H01M 10/663 165/104.31 |
| 2015/0249307 | A1* | 9/2015 | Natter | H01R 13/6276 439/347 |
| 2015/0278038 | A1* | 10/2015 | Halker | G06F 11/20 714/3 |

(Continued)

FOREIGN PATENT DOCUMENTS

| EP | 2711236 A2 | 3/2014 |
|---|---|---|
| EP | 2767430 A1 | 8/2014 |

*Primary Examiner* — Vuthe Siek
(74) *Attorney, Agent, or Firm* — David B. Kelley; Carlson, Gaskey & Olds

(57) ABSTRACT

This disclosure describes exemplary electrified vehicle charging systems and methods for charging energy storage devices (e.g., battery packs) of the vehicles. An exemplary charging system may be configured to monitor the electrified vehicle for determining whether either a recoverable vehicle fault or a non-recoverable vehicle fault occurs during a charging event and to automatically command a charging sequence restart without unplugging a charging component from a vehicle inlet assembly in response to detecting the recoverable vehicle fault. The control system may also be configured to provide remote notification about the need to unplug and replug the charging component when the non-recoverable fault is detected or when greater than a predefined number of charging sequence restarts have been attempted.

18 Claims, 4 Drawing Sheets

(56) References Cited

U.S. PATENT DOCUMENTS

| | | |
|---|---|---|
| 2016/0068073 A1 | 3/2016 | Taylor et al. |
| 2018/0170201 A1* | 6/2018 | Miller .................. B60L 11/1838 |
| 2019/0217728 A1* | 7/2019 | Reber ................... B60L 53/302 |
| 2020/0041609 A1* | 2/2020 | Ames ....................... G01S 7/006 |
| 2020/0055406 A1* | 2/2020 | Vallender ................ B60L 58/12 |

* cited by examiner

SYSTEMS AND METHODS FOR RESTARTING ELECTRIFIED VEHICLE CHARGING WITHOUT UNPLUGGING

TECHNICAL FIELD

This disclosure relates to vehicle charging systems that are equipped to automatically attempt to restart a charging sequence in response to vehicle faults without requiring a user to unplug and replug electric vehicle supply equipment (EVSE).

BACKGROUND

The desire to reduce automotive fuel consumption and emissions is well documented. Therefore, vehicles are being developed that reduce or completely eliminate reliance on internal combustion engines. Electrified vehicles are currently being developed for this purpose. In general, electrified vehicles differ from conventional motor vehicles because they are selectively driven by one or more battery powered electric machines. Conventional motor vehicles, by contrast, rely exclusively on the internal combustion engine to propel the vehicle.

A charging system typically connects an electrified vehicle to an external power source, such as a wall outlet or a charging station, for charging the battery pack of the vehicle. Plug-in hybrid electric vehicles and battery electric vehicles, for example, include a vehicle inlet assembly having ports for receiving a connector from the charging station.

Electrified vehicle users may encounter situations in which vehicle faults occur during charging events. A user is typically required to physically unplug and replug electric vehicle supply equipment (EVSE) to restart the charging sequence when vehicle faults occur during the charging event. Since many public charging stations charge the user a base charging price per plug-in, unplugging and re-plugging the EVSE can result in increased charging costs to the user.

SUMMARY

A charging system for an electrified vehicle according to an exemplary aspect of the present disclosure includes, among other things, a vehicle inlet assembly and a charging component connectable to the vehicle inlet assembly for performing a charging event. A control system is configured to monitor whether a recoverable vehicle fault or a non-recoverable vehicle fault occurs during the charging event, and automatically command a charging sequence restart without unplugging the charging component from the vehicle inlet assembly in response to detecting the recoverable vehicle fault.

In a further non-limiting embodiment of the foregoing charging system, the charging component is a charge cord.

In a further non-limiting embodiment of either of the foregoing charging systems, the charging component is an electric vehicle supply equipment (EVSE).

In a further non-limiting embodiment of any of the foregoing charging systems, the charging event is a DC fast charging event.

In a further non-limiting embodiment of any of the foregoing charging systems, a communication system is configured to wirelessly communicate with a mobile device separate from the electrified vehicle.

In a further non-limiting embodiment of any of the foregoing charging systems, the control system is configured to command the communication system to communicate a remote notification to the mobile device in response to detecting the non-recoverable vehicle fault.

In a further non-limiting embodiment of any of the foregoing charging systems, the mobile device is configured through an application to receive the remote notification.

In a further non-limiting embodiment of any of the foregoing charging systems, the control system is configured to command the communication system to communicate a remote notification to the mobile device when greater than a predefined number of attempted charging sequence restarts have been attempted.

In a further non-limiting embodiment of any of the foregoing charging systems, the mobile device is configured through an application to receive the remote notification.

In a further non-limiting embodiment of any of the foregoing charging systems, the control system includes a plurality of control modules that communicate with one another to control the charging of a battery pack located onboard the electrified vehicle.

In a further non-limiting embodiment of any of the foregoing charging systems, the plurality of control modules include a battery electric control module (BECM), an off-board charge control module, a battery charge control module (BCCM), and a powertrain control module (PCM).

In a further non-limiting embodiment of any of the foregoing charging systems, a mobile device is in communication with the control system. The mobile device is configured through an application to allow a user of the electrified vehicle to remotely initiate the charging sequence restart.

A method according to another exemplary aspect of the present disclosure includes, among other things, automatically attempting to restart a charging sequence of an electrified vehicle in response to detecting a recoverable vehicle fault, and automatically communicating a remote notification to a user of the electrified vehicle in response to detecting a non-recoverable vehicle fault or when greater than a predefined number of attempted charging sequence restarts have been attempted.

In a further non-limiting embodiment of the foregoing method, the method includes, prior to automatically attempting to restart the charging sequence, monitoring whether a vehicle fault is the recoverable vehicle fault or the non-recoverable vehicle fault.

In a further non-limiting embodiment of either of the foregoing methods, automatically attempting to restart the charging sequence is performed without requiring a user of the electrified vehicle to unplug or replug an electric vehicle supply equipment (EVSE) from the electrified vehicle.

In a further non-limiting embodiment of any of the foregoing methods, the method includes receiving a request from a user of the electrified vehicle to initiate the restart of the charging sequence after communicating the remote notification.

In a further non-limiting embodiment of any of the foregoing methods, automatically attempting to restart the charging sequence and automatically communicating the remote notification are performed by a charging control system of the electrified vehicle.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes exemplary electrified vehicle charging systems and methods for charging energy storage devices (e.g., battery packs) of the vehicles. An exemplary charging system may be configured to monitor the electrified vehicle for determining whether either a recoverable vehicle fault or a non-recoverable vehicle fault occurs during a charging event and to automatically command a charging sequence restart without unplugging a charging component from a vehicle inlet assembly in response to detecting the recoverable vehicle fault. The control system may also be configured to provide remote notification about the need to unplug and replug the charging component when the non-recoverable fault is detected or when greater than a predefined number of charging sequence restarts have been attempted. These and other features are discussed in greater detail in the following paragraphs of this detailed description.

Figure 1:
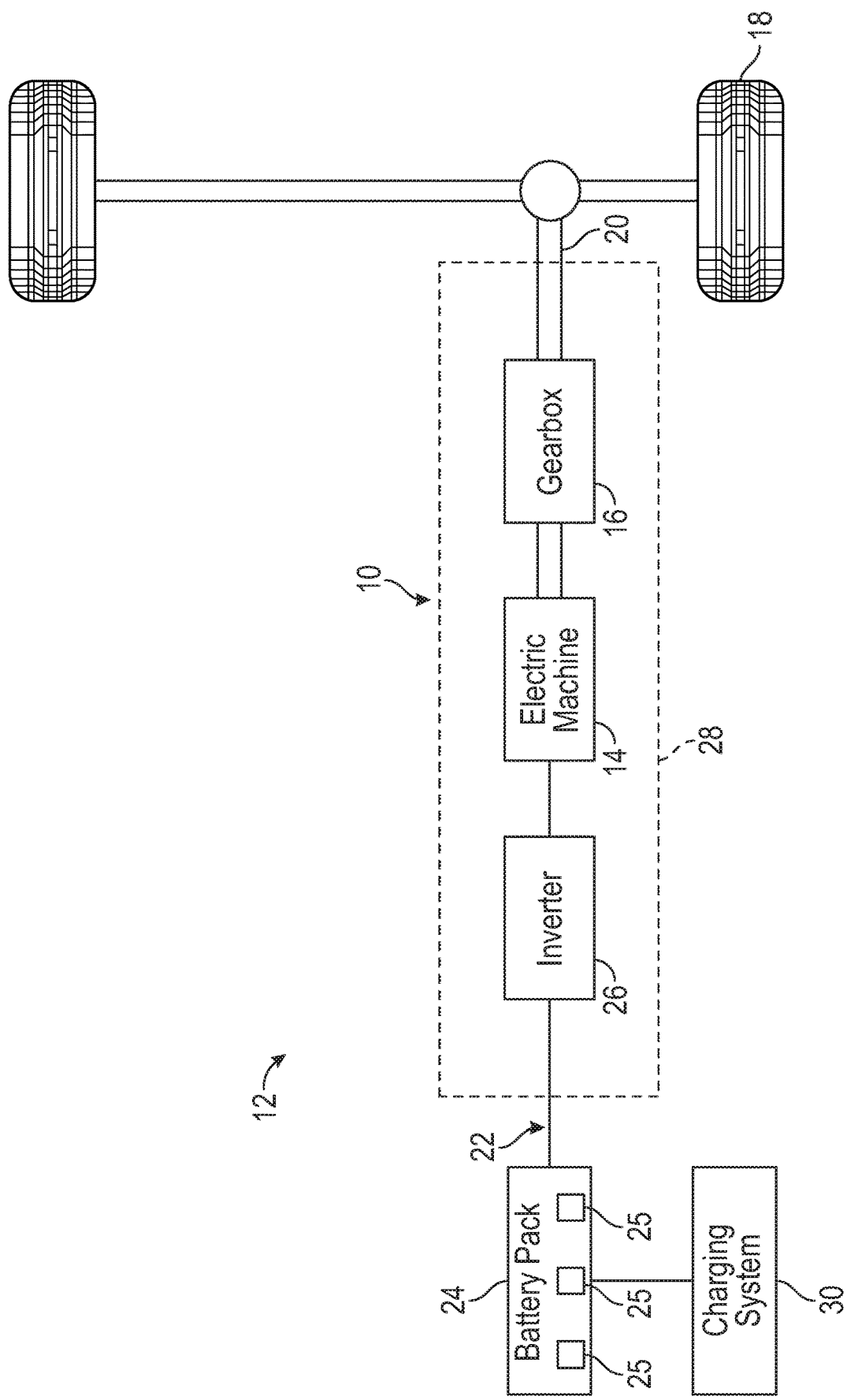
FIG. 1 schematically illustrates a powertrain of an electrified vehicle.

FIG. 1 schematically illustrates a powertrain 10 of an electrified vehicle 12. The electrified vehicle 12 may be a battery electric vehicle (BEV) or a plug-in hybrid electric vehicle (PHEV), for example. Therefore, although not shown in this embodiment, the electrified vehicle 12 could be equipped with an internal combustion engine that can be employed either alone or in combination with other energy sources to propel the electrified vehicle 12.

In the illustrated embodiment, the electrified vehicle 12 is a full electric vehicle propelled solely through electric power, such as by an electric machine 14, without any assistance from an internal combustion engine. The electric machine 14 may operate as an electric motor, an electric generator, or both. The electric machine 14 receives electrical power and provides a rotational output power. The electric machine 14 may be connected to a gearbox 16 for adjusting the output torque and speed of the electric machine 14 by a predetermined gear ratio. The gearbox 16 is connected to a set of drive wheels 18 by an output shaft 20. A voltage bus 22 electrically connects the electric machine 14 to a battery pack 24 through an inverter 26. The electric machine 14, the gearbox 16, and the inverter 26 may be collectively referred to as a transmission 28 of the electrified vehicle 12.

The battery pack 24 is an exemplary electrified vehicle battery. The battery pack 24 may be a high voltage traction battery pack that includes a plurality of battery arrays 25 (i.e., battery assemblies or groupings of battery cells) capable of outputting electrical power to operate the electric machine 14 and/or other electrical loads of the electrified vehicle 12. Other types of energy storage devices and/or output devices can also be used to electrically power the electrified vehicle 12.

The electrified vehicle 12 is also be equipped with a charging system 30 for charging the energy storage devices (e.g., battery cells) of the battery pack 24. As described in greater detail below, the charging system 30 may include charging components that are located both onboard the electrified vehicle 12 and external to the electrified vehicle 12. The charging system 30 can be connected to an external power source for receiving and distributing power received from the external power source throughout the electrified vehicle 12.

The powertrain 10 of FIG. 1 is highly schematic and is not intended to limit this disclosure. Various additional components could alternatively or additionally be employed by the powertrain 10 within the scope of this disclosure. In addition, the teachings of this disclosure may be incorporated into any type of electrified vehicle, including but not limited to cars, trucks, sport utility vehicles, boats, planes, etc.

Figure 2:
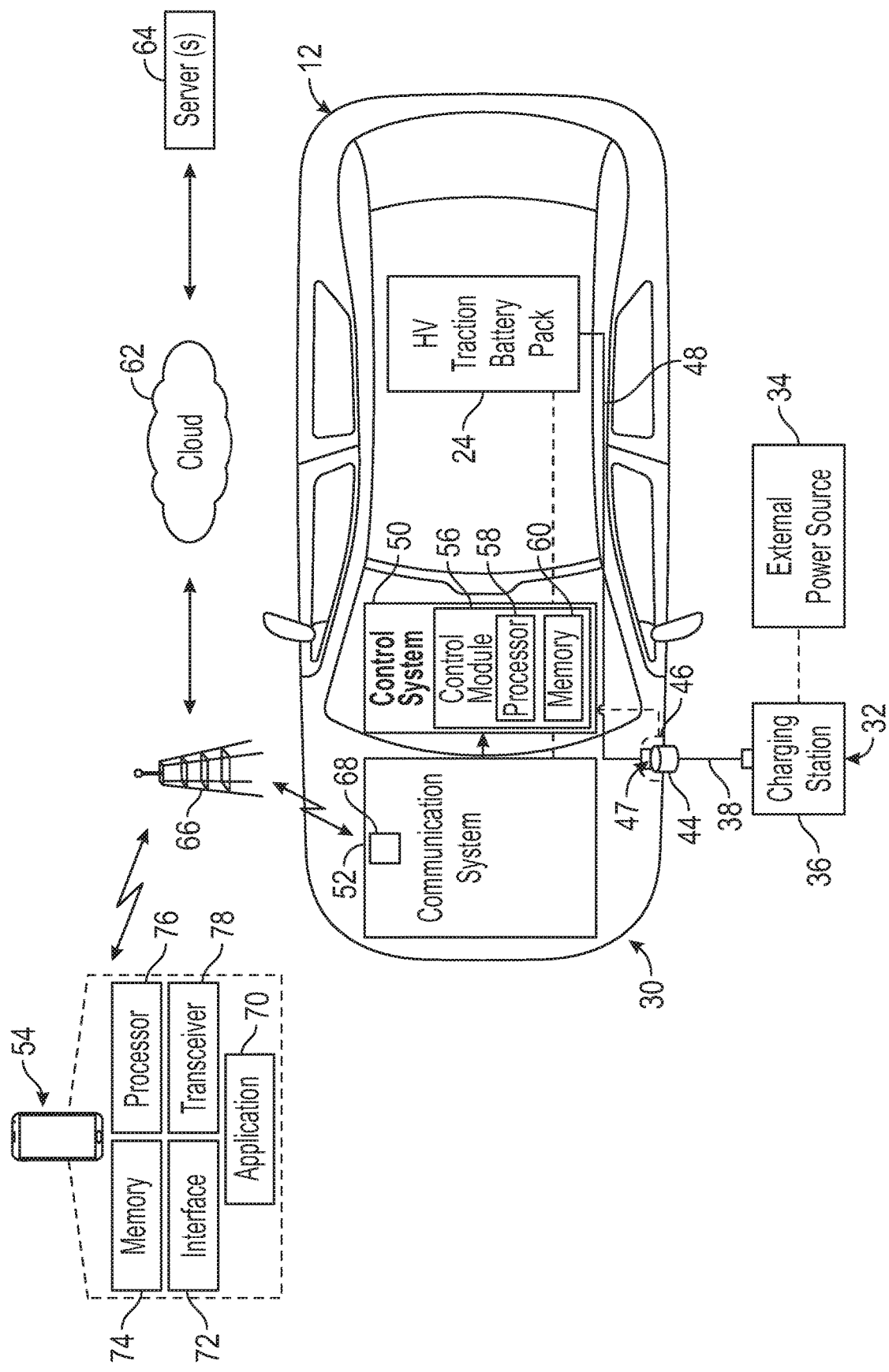
FIG. 2 schematically illustrates an exemplary charging system for controlling charging of an electrified vehicle.

FIG. 2 schematically illustrates an electrified vehicle 12 parked near a charging station 32 for charging. The electrified vehicle 12 may employ the powertrain 10 shown in FIG. 1 or any similar electrified powertrain. The electrified vehicle 12 is equipped with a charging system 30 for charging the battery pack 24. As described in greater detail below, the charging system 30 is capable of both automatically restarting a charging sequence and providing remote notification to a user of the electrified vehicle in response to certain vehicle faults.

The charging station 32 is powered by an external power source 34 (shown schematically). In an embodiment, the external power source 34 includes utility grid power. In another embodiment, the external power source 34 includes an alternative energy source, such as solar power, wind power, etc. In yet another embodiment, the external power source 34 includes a combination of utility grid power and alternative energy sources.

The charging station 32 may include, among other things, a housing 36 and a charge cord 38. In general, the housing 36 houses the various internal components of the charging station 32. The size, shape, and configuration of the housing 36 is not intended to limit this disclosure. The housing 36 may additionally include one or more output displays (not shown) for displaying information to a user of the electrified vehicle 12.

The charge cord 38 may extend outside of the housing 36 for connecting to the electrified vehicle 12. The charge cord 38 may include a charge connector 44 that is configured to connect to a vehicle inlet assembly 46 of the electrified vehicle 12. The charge cord 38 could either be integrally connected to the charging station 32 or could be part of electric vehicle supply equipment (EVSE) that is both connectable and detachable relative to each of the vehicle inlet assembly 46 and the charging station 32.

The vehicle inlet assembly 46 may include a plurality of ports 47 that each include a mating terminal for carrying current during charging events. Power originating from the external power source 34 may be transferred from the charging station 32 to the vehicle inlet assembly 46 for charging the battery pack 24 of the electrified vehicle 12 via the charge connector 44 that is attached to the charge cord 38. One or more high voltage cables 48 may connect between the vehicle inlet assembly 46 and the battery pack 24 for transferring the power received by the vehicle inlet assembly 46 to the battery pack 24 for replenishing the energy of the battery cells of the battery pack 24.

The charging system 30 may be configured to deliver power to the battery pack 24 using any type of charging (e.g., AC, DC, etc.). In an embodiment, the charging system 30 is a DC fast charging system configured for performing direct current (DC) fast charging events. DC fast charging events are relatively immediate, rapid charge events that typically last approximately thirty minutes or less. The charging system 30 may employ DC fast charging by delivering power levels of 50 kW or more to rapidly charge the battery pack 24, as opposed to the power output of standard alternating current chargers, by way of one non-limiting example. The DC fast charging events may involve digital communications between the charging system 30 and the charging station 32 and are capable of delivering DC power to the battery pack 24 without the need to perform any AC/DC conversions.

The charging system 30 of the electrified vehicle 12 may include a multitude of components that function together to control charging of the electrified vehicle 12. In an embodiment, the charging system 30 includes the charge cord 38, the charge connector 44, the vehicle inlet assembly 46, the high voltage cable 48, and the battery pack 24. Thus, the charging system 30 can include components that are located both onboard and external to the electrified vehicle 12.

A vehicle fault may periodically occur during charging events in which the electrified vehicle 12 is charging at the charging station 32. A user is typically required to physically unplug and replug the charge cord 38 to restart the charging sequence when vehicle faults occur during the charging event. Since many public charging stations charge the user a base charging price per plug-in, unplugging and re-plugging the charge cord 38 can result in increased charging costs to the user. When certain conditions are met, the charging system 30 may therefore be configured to automatically restart the charging sequence in response to vehicle faults and without the need to unplug and replug the charge cord 38.

In order to facilitate automatic restarts of faulted charging sequences and for providing remote notifications of detected vehicle faults, the charging system 30 may additionally include a control system 50, a communication system 52, and a mobile device 54 that is associated with the owner/user of the electrified vehicle 12. These components/systems are described in greater detail below.

The control system 50 is configured to control charging of the electrified vehicle 12 once connected to the charging station 32. The control system 50 may be part of an overall vehicle control system or could be a separate control system that communicates with the vehicle control system. The control system 50 may include one or more control modules 56 equipped with executable instructions for interfacing with and commanding operation of various components of the charging system 30. Each control module 56 of the control system 50 may include a processing unit 58 and non-transitory memory 60 for executing the various control strategies and modes of the charging system 30, including but not limited to the ability to restart a charging sequence without requiring the charge cord 38 to be unplugged and replugged in response to certain vehicle faults.

Figure 3:
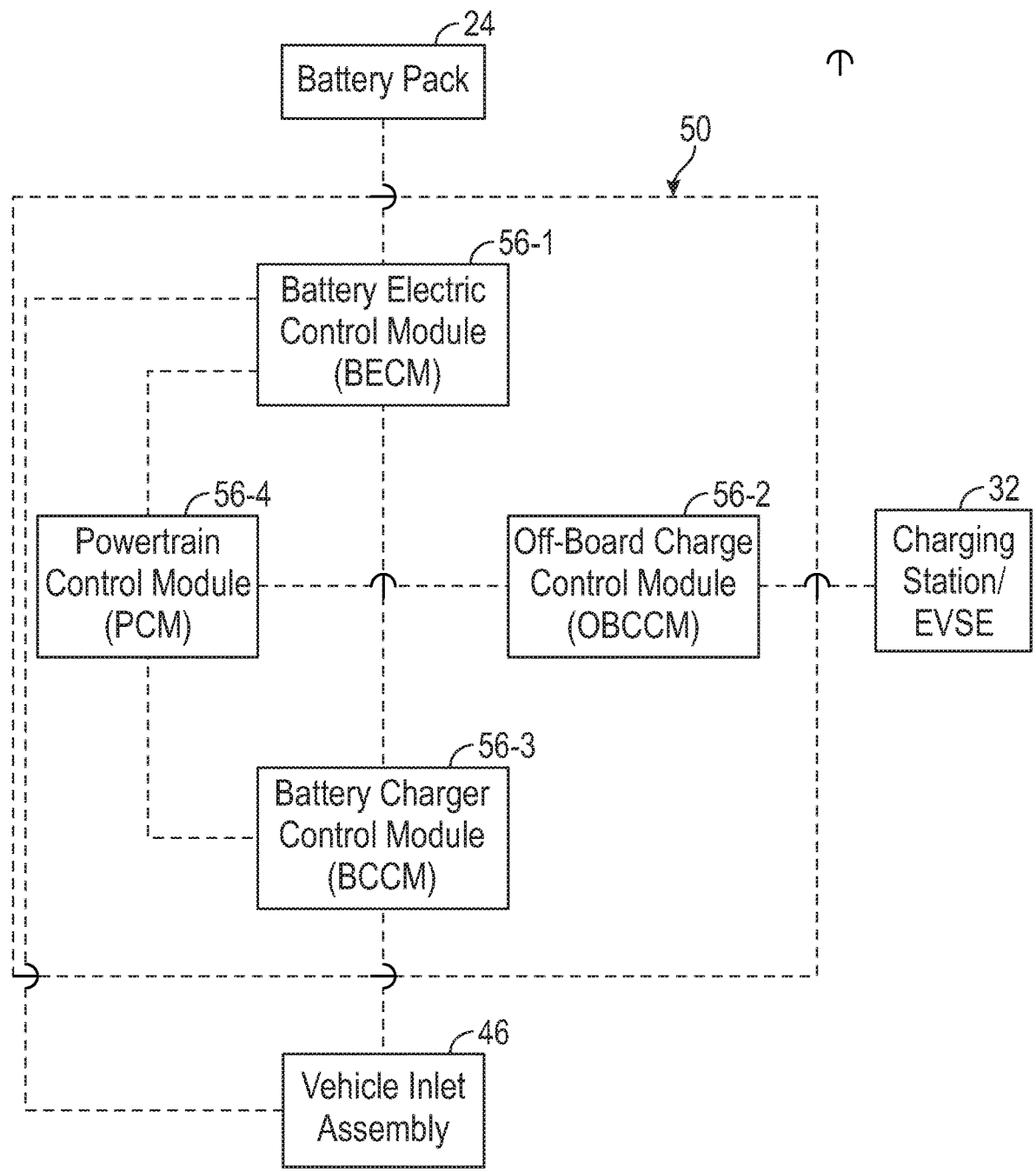
FIG. 3 is a block diagram illustrating an exemplary control system of the charging system of FIG. 2.

In an embodiment, as schematically shown in FIG. 3, the control system 50 may include each of a battery electric control module (BECM) 56-1 (i.e., a first control module), an off-board charge control module (OBCCM) 56-2 (i.e., a second control module), a battery charge control module (BCCM) 56-3 (i.e., a third control module), and a powertrain control module (PCM) 56-4 (i.e., a fourth control module). The control modules 56-1, 56-2, 56-3, and 56-4 are capable of communicating with one another to control the charging of the battery pack 24. The total number of control modules employed by the control system 50 is not intended to limit this disclosure, and other control system configurations than the one shown in FIG. 3 are further contemplated within the scope of this disclosure.

The BECM 56-1 may be configured, among other things, to control the flow of energy between the vehicle inlet assembly 46 and the battery pack 24. For example, the BECM 56-1 may be configured to monitor and manage the temperature and state of charge of each of battery cell of the battery pack 24. In an embodiment, the BECM 56-1 may command the opening or closing of a plurality of switches for controlling the flow of energy to the battery pack 24 in response to the temperature or the state of charge of a given battery cell reaching a predetermined threshold.

The OBCCM 56-2 may be configured, among other things, to communicate with and control operation of the charging station 32. This may include, for example, communicating with and controlling various off-board charging components such as the charge cord 38 or some other EVSE. For example, the OBCCM 56-2 may automatically command the charging station 32 to restart a charge sequence in response to certain vehicle faults that may occur during a given charging event.

The BCCM 56-3 may communicate with the BECM 56-1. For example, the BCCM 56-3 may send a signal to the BECM 56-1 indicative of a DC fast charging event, such as when the connector 44 of the charge cord 38 is plugged into the vehicle inlet assembly 46. In response to the signal, the BECM 56-1 may command the opening or closing of the plurality of switches, thereby allowing the transfer of electric energy between the vehicle inlet assembly 46 and the battery pack 24 during the DC fast charging event.

The PCM 56-4 may be configured, among other things, to monitor various vehicle processes and to reset certain vehicle processes in response to various vehicle faults that may occur during the charging events. In an embodiment, the PCM 56-4 acts as an interface for performing various handshaking sequences between the BECM 56-1, the OBCCM 56-2, and the BCCM 56-3 during charging events.

Referring again to FIG. 2, the communication system 52 of the charging system 30 may be configured to communicate over a cloud 62 (i.e., the internet) to obtain various information stored on one or more servers 64. Each server 64 can identify, collect, and store user data associated with the electrified vehicle 12 for validation purposes. Upon an authorized request, data may be subsequently transmitted to the communication system 52 via a cellular tower 66 or some other known communication technique (e.g., Wi-Fi, Bluetooth, etc.). The communication system 52 may include one or more transceivers 68 for achieving bidirectional communication with the cellular tower 66. For example, the transceiver 68 can receive data from the servers 64 or can communicate data back to the servers 64 via the cellular tower 66. Although not necessarily shown or described in this highly schematic embodiment, numerous other components may enable bidirectional communication between the electrified vehicle 12 and the web-based servers 64.

Once the mobile device 54 has been validated and synced to the electrified vehicle 12, the communication system 52 may also communicate with the mobile device 54 over the bidirectional communication link established between the transceiver 68 and the cellular tower 66. Communications between the communication system 52 and the mobile device 54 may occur over a wireless link, an Internet connection, or some combination of these.

The mobile device 54 (e.g., a smart phone, tablet, computer, wearable smart device, etc.) in most implementations belongs to the owner/user of the electrified vehicle 12. The mobile device 54 may include an application 70 that includes programming to allow the user to employ a user interface 72 to selectively control charging of the electrified vehicle 12. The application 70 may be stored in memory 74 of the mobile device 54 and may be executed by a processor 76 of the mobile device 54. The mobile device 54 may additionally include a transceiver 78 that is configured to communicate with the transceiver 68 of the communication system 52 over the cellular tower 66 or some other wireless link.

In an embodiment, the control system 50 is configured to monitor the electrified vehicle 12 for detecting vehicle faults that may occur during charging events (e.g., DC fast charging events). The vehicle faults may be categorized as either recoverable faults or non-recoverable faults. Example recoverable faults include, but are not limited to, coolant pump faults, communication faults, time-out faults, battery pack over-temperature faults, etc. Example non-recoverable faults include, but are not limited to, battery cell damage faults, battery cell overvoltage faults, etc.

The control system 50 may attempt to automatically command a restart of the charging sequence without notifying the user in response to detecting a recoverable fault during a charging event. The control system 50 may further be configured to communicate a remote notification of the vehicle fault to the mobile device 54 of the user, such as in response to detecting a non-recoverable fault or when a charging sequence restart has been attempted a predefined number of times without success. In response to receiving the remote notification from the communication system 52, the user of the electrified vehicle 12 may, via the application 70 of the mobile device 54, command operation of the charging system 30 in a certain manner. For example, the user may utilize the application to 70 command a restart of the charging sequence without the need to unplug and replug the charge cord 38.

Figure 4:
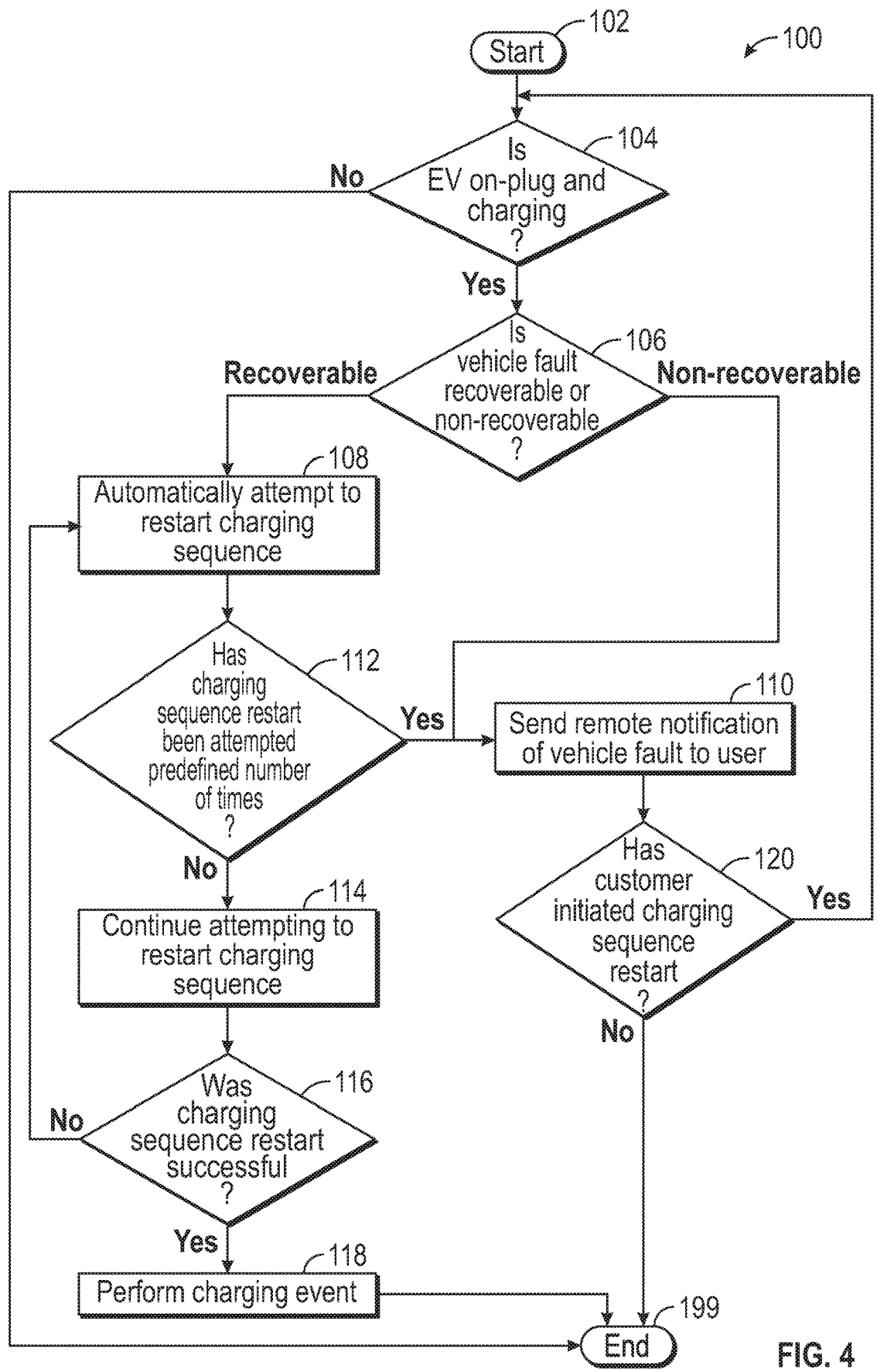
FIG. 4 schematically illustrates a method for controlling charging of an electrified vehicle.

FIG. 4, with continued reference to FIGS. 1-3, schematically illustrates a method 100 for controlling charging of the electrified vehicle 12. In an embodiment, the control system 50 is programmed with one or more algorithms adapted to execute the exemplary method 100. Among other things, the method 100 allows a user of the electrified vehicle to remotely restart charging sequences when certain vehicle faults occur.

The exemplary method 100 may begin at block 102. At block 104, the control system 50 may monitor whether the electrified vehicle 12 is on-plug and charging. For example, the control system 50 may receive a plug connection signal in response to a user plugging the charge connector 44 into the vehicle inlet assembly 46. In an embodiment, the plug connection signal is received from the BCCM 56-3 of the control system 50. The control system 50 may additionally monitor whether a current charge mode of the charging system 30 is a DC fast charging mode at block 104.

If block 104 returns a YES flag, the method 100 may proceed to block 106. Alternatively, if a NO flag is returned, the method 100 may end at block 199, such as by powering down the electrified vehicle 12.

At block 106, the control system 50 may monitor the electrified vehicle 12 for detecting vehicle faults that may occur during the charging event. The method 100 may proceed to block 108 when the control system 50 detects that the vehicle fault is a recoverable vehicle fault, or the method 100 may proceed to block 110 when the vehicle fault is a non-recoverable vehicle fault.

If a recoverable fault is detected at block 106, the method 100 may proceed to block 108. The control system 50 may automatically attempt to restart the charging sequence at block 108. The charging sequence restart command may be performed without requiring the charge cord 38 or any other EVSE to be unplugged from the vehicle inlet assembly 46 and without specifically notifying the user. In an embodiment, the control system 50 performs a handshake with the offboard charging equipment through the OBCCM 56-2 using digital communications. The signals exchanged within the control system 50 for attempting to restart the charging sequence may include, but are not limited to, a charging status from the BECM 56-1, a charging status from the BCCM 56-3, processed pilot duty cycle, signals to sustain wake mode, S2 switching signals, contactor command, charge voltage request, and charge current request. In another embodiment, the control system 50 utilizes a buffer control block (BCB) toggle method to restart the charging sequence. The BCB toggle method may include varying the resistance of the control pilot circuit with a certain frequency during the digital communication with the EVSE or charge cord 38.

Next, at block 112, the control system 50 may determine whether a charging sequence restart has been attempted a predefined number of times. The predefined number of times for attempting to restart the charging sequence could be set at any desired value (e.g., 3 attempted restarts, 5 attempted restarts, etc.). If block 112 returns a NO flag, the control system 50 may continue to attempt to restart the charging sequence at block 114. Subsequently, at block 116, the control system 50 may determine whether the most recent charging sequence restart attempt was successful. If a YES flag is returned, the method 100 then proceeds to block 118 by charging the battery pack 24 of the electrified vehicle 12 during a charging event. In an embodiment, the charging event that occurs at block 118 is a DC fast charging event. Alternatively, if a NO flag is returned at block 116, the method 100 may return to block 108.

If block 112 alternatively returns a YES flag, the method 100 may proceed to block 110. At this step, the control system 50 may command the communication system 52 to communicate a remote notification to the mobile device 54 of the user of the electrified vehicle 12. The remote notification may provide remote notice of the vehicle fault to the user and may further provide notice that the charging sequence failed to restart after a calibratable number of times.

The user may then be given the ability to attempt to restart the charge remotely. For example, the user may attempt to restart the charge remotely using the application 70 of the mobile device 54. The user may additionally be given the opportunity to decide whether to physically unplug and replug the charge cord 38 in order to restart the charging sequence with the understanding that such an activity may incur additional charging costs.

The control system 50 may determine whether the user has remotely initiated a charging sequence restart at block 120. If a YES flag is returned, the method 100 may return to block 104 and the sequence of steps described above is repeated. Alternatively, if a NO flag is returned, the method 100 may end at block 199.

If a non-recoverable fault is detected at block 106, the method 100 may proceed directly to block 110. At this step, the control system 50 may command the communication system 52 to communicate a remote notification to the mobile device 54 of the user of the electrified vehicle 12. In this embodiment, the remote notification provides remote notice of the non-recoverable vehicle fault to the user.

The user may then be given the ability to attempt to restart the charging sequence remotely. For example, the user may attempt to restart the charge remotely via the application 70 of the mobile device 54. The control system 50 may determine whether the user has remotely initiated a charging sequence restart at block 120. If a YES flag is returned, the method 100 may return to block 104. Alternatively, if a NO flag is returned, the method 100 may end at block 199.

The exemplary charging systems and methods described above are configured to both remotely alert a user about vehicle faults that occur during charging events and allow the user to remotely restart a vehicle charging sequence when certain vehicle faults occur. The remote charging sequence restart attempt may be performed without unplugging and replugging any EVSE. This allows users to decide whether to unplug and replug should additional costs be associated with replugging. The systems and methods of this disclosure thereby improve the overall customer experience by providing a more cost effective fault recovery when charging electrified vehicles.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A charging system for an electrified vehicle, comprising:
    a vehicle inlet assembly;
    a charging component connectable to the vehicle inlet assembly for performing a charging event; and
    a control system configured to:
        monitor whether a recoverable vehicle fault or a non-recoverable vehicle fault occurs during the charging event; and
        automatically command a charging sequence restart without unplugging the charging component from the vehicle inlet assembly in response to detecting the recoverable vehicle fault.

2. The charging system as recited in claim 1, wherein the charging component is a charge cord.

3. The charging system as recited in claim 1, wherein the charging component is an electric vehicle supply equipment (EVSE).

4. The charging system as recited in claim 1, wherein the charging event is a DC fast charging event.

5. The charging system as recited in claim 1, comprising a communication system configured to wirelessly communicate with a mobile device separate from the electrified vehicle.

6. The charging system as recited in claim 5, wherein the control system is configured to command the communication system to communicate a remote notification to the mobile device when greater than a predefined number of attempted charging sequence restarts have been attempted.

7. The charging system as recited in claim 6, wherein the mobile device is configured through an application to receive the remote notification.

8. The charging system as recited in claim 1, wherein the control system includes a plurality of control modules that communicate with one another to control the charging of a battery pack located onboard the electrified vehicle.

9. The charging system as recited in claim 8, wherein the plurality of control modules include a battery electric control module (BECM), an off-board charge control module, a battery charge control module (BCCM), and a powertrain control module (PCM).

10. The charging system as recited in claim 1, comprising a mobile device in communication with the control system, wherein the mobile device is configured through an application to allow a user of the electrified vehicle to remotely initiate the charging sequence restart.

11. The charging system as recited in claim 1, wherein the control system is configured to automatically command communication of a remote notification in response to detecting the non-recoverable vehicle fault or when greater than a predefined number of attempted charging sequence restarts have been attempted.

12. A charging system, comprising:
    a vehicle inlet assembly;
    a charging component connectable to the vehicle inlet assembly for performing a charging event;
    a communication system configured to wirelessly communicate with a mobile device separate from the electrified vehicle; and
    a control system configured to:
    monitor whether a recoverable vehicle fault or a non-recoverable vehicle fault occurs during the charging event;
    automatically command a charging sequence restart without unplugging the charging component from the vehicle inlet assembly in response to detecting the recoverable vehicle fault; and
    command the communication system to communicate a remote notification to the mobile device in response to detecting the non-recoverable vehicle fault.

13. The charging system as recited in claim 12, wherein the mobile device is configured through an application to receive the remote notification.

14. A method, comprising:
    automatically attempting to restart a charging sequence of an electrified vehicle in response to detecting a recoverable vehicle fault; and
    automatically communicating a remote notification to a user of the electrified vehicle in response to detecting a non-recoverable vehicle fault or when greater than a predefined number of attempted charging sequence restarts have been attempted.

15. The method as recited in claim 14, comprising, prior to automatically attempting to restart the charging sequence:
    monitoring whether a vehicle fault is the recoverable vehicle fault or the non-recoverable vehicle fault.

16. The method as recited in claim 14, wherein automatically attempting to restart the charging sequence is performed without requiring a user of the electrified vehicle to unplug or replug an electric vehicle supply equipment (EVSE) from the electrified vehicle.

17. The method as recited in claim 14, comprising:
receiving a request from a user of the electrified vehicle to initiate the restart of the charging sequence after communicating the remote notification.

18. The method as recited in claim 14, wherein automatically attempting to restart the charging sequence and automatically communicating the remote notification are performed by a charging control system of the electrified vehicle.

* * * * *